(12) United States Patent
Huber et al.

(10) Patent No.: US 11,331,836 B2
(45) Date of Patent: May 17, 2022

(54) METHODS OF OVERMOLDING SOFTER MATERIAL WITH HARDER MATERIAL AND MOISTURE TIGHT CONTAINER ASSEMBLIES MADE BY THE METHODS

(71) Applicant: CSP TECHNOLOGIES, INC., Auburn, AL (US)

(72) Inventors: Donald Huber, Auburn, AL (US); Jonathan R. Freedman, Auburn, AL (US); Brian Tifft, Auburn, AL (US); Franklin Lee Lucas, Jr., Opelika, AL (US)

(73) Assignee: CSP Technologies, Inc., Auburn, AL (US)

(*) Notice: Subject to any disclaimer, the term of this patent is extended or adjusted under 35 U.S.C. 154(b) by 382 days.

(21) Appl. No.: 16/499,481

(22) PCT Filed: Mar. 30, 2018

(86) PCT No.: PCT/US2018/025325
§ 371 (c)(1),
(2) Date: Sep. 30, 2019

(87) PCT Pub. No.: WO2018/183791
PCT Pub. Date: Oct. 4, 2018

(65) Prior Publication Data
US 2020/0070392 A1 Mar. 5, 2020

Related U.S. Application Data

(60) Provisional application No. 62/480,070, filed on Mar. 31, 2017.

(51) Int. Cl.
*B29C 45/16* (2006.01)
*B29C 45/00* (2006.01)
(Continued)

(52) U.S. Cl.
CPC ...... *B29C 45/1676* (2013.01); *B29C 45/0001* (2013.01); *B29C 45/0046* (2013.01);
(Continued)

(58) Field of Classification Search
CPC .... B65D 43/164; B65D 43/162; B65D 43/16; B65D 47/0838; B65D 53/02; B65D 55/16;
(Continued)

(56) References Cited

U.S. PATENT DOCUMENTS 3,323,671 A 6/1967 Minarik, Jr. et al.
4,022,352 A 5/1977 Pehr
(Continued)

FOREIGN PATENT DOCUMENTS

BE 509694 A 3/1952
CN 1185139 A 6/1998
(Continued)

OTHER PUBLICATIONS

Written Opinion issued in PCT/US2018/053652, dated Jan. 1, 2019.
(Continued)

*Primary Examiner* — Robert J Hicks
(74) *Attorney, Agent, or Firm* — Mark T. Vogelbacker; Eckert Seamans Cherin & Mellott, LLC

(57) ABSTRACT

A method of over-molding materials includes: providing a first material in a groove in a first portion of a mold such that only a single surface of the first material is exposed to a vacant portion of the mold; providing, via an injection molding process, a second material in a liquid form in the vacant portion of the mold adjacent to, and in engagement with, the first material; and allowing the second material to solidify and become directly coupled to the first material, thus forming a single component. The second material has one or both of a greater hardness when solidified than the
(Continued)

first material and/or a higher melting temperature than the first material.

19 Claims, 4 Drawing Sheets

(51) Int. Cl.
    *B65D 43/16*     (2006.01)
    *B65D 53/02*     (2006.01)
    *B29K 21/00*     (2006.01)
    *B29K 23/00*     (2006.01)
    *B29L 31/56*     (2006.01)
    *B29L 31/00*     (2006.01)

(52) U.S. Cl.
CPC ........ *B29C 45/0081* (2013.01); *B65D 43/162* (2013.01); *B65D 53/02* (2013.01); *B29C 2045/1678* (2013.01); *B29K 2021/003* (2013.01); *B29K 2023/00* (2013.01); *B29K 2023/06* (2013.01); *B29K 2023/12* (2013.01); *B29L 2031/565* (2013.01); *B29L 2031/712* (2013.01); *B65D 2251/20* (2013.01); *B65D 2543/00092* (2013.01); *B65D 2543/00296* (2013.01); *B65D 2543/00537* (2013.01); *B65D 2543/00629* (2013.01); *B65D 2543/00685* (2013.01); *B65D 2543/00953* (2013.01)

(58) Field of Classification Search
CPC . B65D 1/023; B29C 45/1676; B29C 45/0001; B29C 45/0046; B29C 45/0081
USPC .... 220/836, 810, 375; 215/237, 235, 45, 43, 215/306
See application file for complete search history.

(56) References Cited

U.S. PATENT DOCUMENTS

| | | |
|---|---|---|
| 4,291,818 A | 9/1981 | Nozawa et al. |
| 4,308,965 A | 1/1982 | Dutt |
| 4,403,712 A | 9/1983 | Wiesinger |
| 4,457,458 A | 7/1984 | Heinol |
| 4,545,508 A | 10/1985 | Cribb, Jr. et al. |
| 4,911,337 A | 3/1990 | Rosenthal |
| 4,936,494 A | 6/1990 | Weidman |
| 4,941,592 A | 7/1990 | Kitterman |
| 5,038,957 A | 8/1991 | Gross |
| D331,878 S | 12/1992 | Forsyth |
| D334,538 S | 4/1993 | Bolen, Jr. et al. |
| RE34,263 E | 5/1993 | vanKerkhoven et al. |
| D339,065 S | 9/1993 | Forsyth et al. |
| D340,187 S | 10/1993 | Forsyth |
| 5,330,082 A | 7/1994 | Forsyth |
| 5,499,736 A | 3/1996 | Kohl |
| 5,769,253 A | 6/1998 | Gross |
| 5,911,937 A | 6/1999 | Hekal |
| 6,039,197 A | 3/2000 | Braun |
| 6,080,350 A | 6/2000 | Hekal |
| 6,124,006 A | 9/2000 | Hekal |
| 6,130,263 A | 10/2000 | Hekal |
| 6,142,325 A | 11/2000 | Chomik |
| 6,194,079 B1 | 2/2001 | Hekal |
| 6,214,255 B1 | 4/2001 | Hekal |
| D448,296 S | 9/2001 | Bried et al. |
| RE37,634 E | 4/2002 | Hickman et al. |
| 6,486,231 B1 | 11/2002 | Hekal |
| 6,510,971 B1 | 1/2003 | Martin |
| D476,892 S | 7/2003 | Martin et al. |
| 6,769,558 B1 * | 8/2004 | Bucholtz ................ B65D 1/16 215/237 |
| D509,426 S | 9/2005 | Samz et al. |
| 7,005,459 B2 | 2/2006 | Hekal |
| D529,800 S | 10/2006 | Liebe |
| 7,213,720 B2 | 5/2007 | Giraud |
| 7,819,267 B2 | 10/2010 | Kick |
| 8,297,457 B2 | 10/2012 | Kick |
| 8,505,188 B2 * | 8/2013 | Lenz ................ B65D 47/0838 29/527.1 |
| 2002/0125203 A1 | 9/2002 | Bried et al. |
| 2010/0140116 A1 | 6/2010 | Stiene et al. |
| 2011/0127269 A1 | 6/2011 | Bucholtz et al. |
| 2014/0190925 A1 | 7/2014 | Ropele |
| 2016/0039955 A1 | 2/2016 | Klein et al. |
| 2019/0092536 A1 | 3/2019 | Freedman et al. |

FOREIGN PATENT DOCUMENTS

| | | |
|---|---|---|
| CN | 1326413 A | 12/2001 |
| DE | 4329364 A1 | 3/1994 |
| DE | 19907225 A1 | 8/2000 |
| EP | 0112103 A2 | 6/1984 |
| JP | S59124270 A | 7/1984 |
| JP | H02205569 A | 8/1990 |
| JP | 2840963 B2 | 12/1998 |
| JP | 2004-543615 | 1/2006 |
| JP | 2006502062 A | 1/2006 |
| WO | 9633108 A1 | 10/1996 |
| WO | 2017152189 A1 | 9/2017 |

OTHER PUBLICATIONS

"Multi-component Molding of Polymers: Technology, Molds", https://plastinfo.ru/information/articles/157; accessed Nov. 1, 2021.
International Search Report for International Application No. PCT/US2018/025325, dated Jul. 6, 2018.

* cited by examiner

METHODS OF OVERMOLDING SOFTER MATERIAL WITH HARDER MATERIAL AND MOISTURE TIGHT CONTAINER ASSEMBLIES MADE BY THE METHODS

CROSS-REFERENCE TO RELATED APPLICATIONS

This application is a U.S. National Phase of International Application No. PCT/US2018/025325 filed Mar. 30, 2018, which claims priority to U.S. Provisional Patent Application No. 62/480,070 filed Mar. 31, 2017, which are incorporated herein by reference in their entirety.

BACKGROUND OF THE INVENTION

1. Field of the Invention

The present invention relates to an improved moisture tight container assembly, and more particularly, relates to a moisture tight container assembly which includes a soft seal. The present invention further relates to a method of forming a moisture tight container assembly having a soft seal. The present invention also relates to a method of forming a soft seal.

2. Description of the Related Art

Containers of various sizes which are designed to prevent moisture infiltration are commonly used in applications from storing sporting goods to medical supplies. Generally, the complexity, and correspondingly the cost, of such containers increases as the ability of such containers to resist moisture infiltration increases. A need exists for such containers which are highly resistant to moisture infiltration while also manufacturable at a reasonable cost.

In the field of diagnostic test strip packaging, it is known to store such strips in containers that form moisture tight seals between plastic (hard) surfaces. For example, a seal may be formed by a mating configuration between the skirt of a cap and the outer rim or lip of a container body. Such seals have proven generally effective and useful in providing a good shelf life to the strips. However, the manufacturing of such containers can result in an undesirably wide standard deviation in moisture tightness across a population of containers made during an automated injection molding process.

The Applicant has determined that incorporating an elastomeric sealing member to provide a compression seal (soft seal) between the cap and the container body can help to reduce moisture vapor transmission into the container and also tighten the above-mentioned standard deviation. The Applicant has further uniquely determined that a hard sealing arrangement in series with the soft sealing arrangement can help maintain a compression seal formed by the soft sealing arrangement and improve moisture tightness of the container. However, incorporating such an elastomeric sealing member into the container design is not a simple endeavor. One challenge is that the interacting surfaces of the hard sealing arrangement must be free from scratches and parting lines, which would adversely affect integrity of the hard sealing arrangement. As a result of such requirement, removal of the injection molding core needed to form a cap and reinsertion of another core needed to form an elastomeric sealing element in the cap may result in scratching/scarring of a sealing surface on the skirt of the cap, thus creating a point for moisture ingress.

In order to avoid such scratching/scarring of the hard surface of the cap, it would theoretically be preferred to first provide the elastomeric material in a mold cavity and then overmold the more rigid polymeric resin material of the cap onto the comparatively softer material. However, such a process was not heretofore possible using conventional injection molding techniques. In the injection molding field, it is known that one should shoot a softer and lower melt temperature plastic over a harder and higher melt temperature plastic. It has been believed that the process should not be done the other way around. This is due to the fact that the harder, higher melt temperature material would displace the softer, lower melt temperature material, if the softer material would be shot first in an overmolding process. However, due to the above-noted problems associated with injection molding a container and cap assembly having an elastomeric sealing element, there is a need for an overmolding process that permits shooting the harder material onto the softer material.

SUMMARY OF THE INVENTION

Accordingly, Applicants have devised inventive methods of overmolding which permit shooing the harder material onto the softer material.

As one aspect of the invention, a method of over-molding materials is provided. The method comprises: providing a first material in a groove in a first portion of a mold such that only a single surface of the first material is exposed to a vacant portion of the mold; providing, via an injection molding process, a second material in a liquid form in the vacant portion of the mold adjacent to, and in engagement with, the first material; and allowing the second material to solidify and become directly coupled to the first material thus forming a single component. The second material has one or both of: a greater hardness when solidified than the first material and/or a higher melting temperature than the first material.

Providing a first material in a groove may comprise providing the first material in the groove via another injection molding process.

The second material may be provided via the injection molding process so as to flow in a direction generally parallel to the single surface of the first material which is exposed.

The method may further comprise removing the component from the mold.

As another aspect of the invention, a method of forming a cap assembly for use with a container in forming a container assembly is provided. The cap assembly includes a seal formed from a first material and a cap formed from a second material having one or both of a greater hardness when solidified than the first material and/or a higher melting temperature than the first material. The method comprises: providing, in a mold having a portion which defines the shape of the cap, the first material in a groove in a first portion of the mold such that only a single surface of the first material is exposed to a vacant portion of the mold; providing, via an injection molding process, the second material in a liquid form in the vacant portion of the mold adjacent to, and in engagement with, the first material; and allowing the second material to solidify and become directly coupled to the first material, thus forming the cap assembly.

Providing a first material in a groove may comprise providing the first material in the groove via another injection molding process.

The second material may be provided via the injection molding process so as to flow in a direction generally parallel to the single surface of the first material which is exposed.

The method may further comprise removing the cap assembly from the mold.

The mold may further have a portion which defines the shape of the container; the method may further comprise: before providing the second material in the portion of the mold which defines the shape of the cap, providing, via the injection molding process, the second material in the liquid form in the portion of the mold which defines the shape of the container; and allowing the second material to solidify and become directly coupled to the first material thus forming the cap assembly.

Optionally, in any embodiment, the second material solidifies and forms a container assembly in which the container is formed integrally with the cap.

The method may further comprise removing the container assembly from the mold.

As yet another aspect of the invention, a cap formed in accordance with any of the above methods is provided.

As yet a further aspect of the invention, a container assembly formed in accordance with any of the above methods is provided.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

The invention will be described in conjunction with the following drawings in which like reference numerals designate like elements and wherein.

DETAILED DESCRIPTION OF EXEMPLARY EMBODIMENTS

Figure 1:
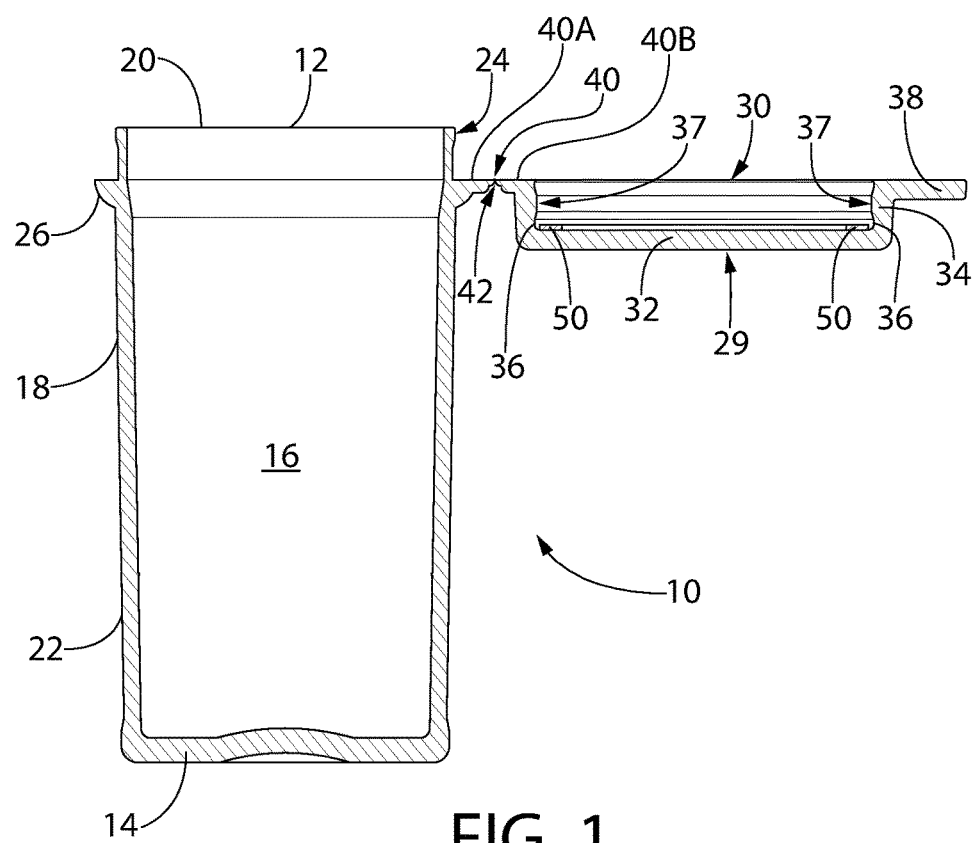
FIG. 1 is a sectional side elevation view of a container assembly in accordance with an exemplary embodiment of the present invention shown with a cap disposed in an open position.

As used herein, the singular form of "a", "an", and "the" include plural references unless the context clearly dictates otherwise.

As used herein, "and/or" means that either or both of the items separated by such terminology are involved. For example, the phrase "A and/or B" would mean A alone, B alone, or both A and B.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other. As used herein, "fixedly coupled" or "fixed" means that two components are coupled so as to move as one while maintaining a constant orientation relative to each other.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, "generally" means "in a general manner" relevant to the term being modified as would be understood by one of ordinary skill in the art.

As used herein, the word "unitary" means a component is created as a single piece or unit. That is, a component that includes pieces that are created separately and then coupled together as a unit is not a "unitary" component or body.

As used herein, the statement that two or more parts or components "engage" one another shall mean that the parts exert a force against one another either directly or through one or more intermediate parts or components.

As used herein, the term "number" shall mean one or an integer greater than one (i.e., a plurality).

As used herein, the phrases "sealingly engage" or "sealing engagement" shall refer to elements which contact each other in a manner such that a generally moisture-tight seal is formed therebetween.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Generally speaking, as used herein, the term "moisture-tight" is defined as having a moisture ingress (after three days) of less than 1500 µg of water, in another embodiment, less than 500 µg of water, in a further embodiment, less than 300 µg of water, in yet another embodiment, less than 150 µg of water, as determined by the following test method: (a) place one gram plus or minus 0.25 grams of molecular sieve in the container and record the weight; (b) fully close the container; (c) place the closed container in an environmental chamber at conditions of 80% relative humidity and 72° F.; (d) after one day, weigh the container containing the molecular sieve; (e) after four days, weigh the container containing the molecular sieve; and (f) subtract the first day sample from the fourth day sample to calculate the moisture ingress of the container in units of micrograms of water. A preferred rate of ingress of moisture into a moisture-tight sealed container produced according to an aspect of the disclosed concept is in the range of about 200-300 μg/day of water or less. A "moisture tight" seal therefore is a sealing engagement that alone, or in combination with additional sealing engagements, help to render a container "moisture tight" per the above definition.

As used herein, the term "resealable" means the lid of the container can be opened or reopened and closed or reclosed many times (e.g. more than 10 times) and still retain its moisture-tight properties.

Figure 2:
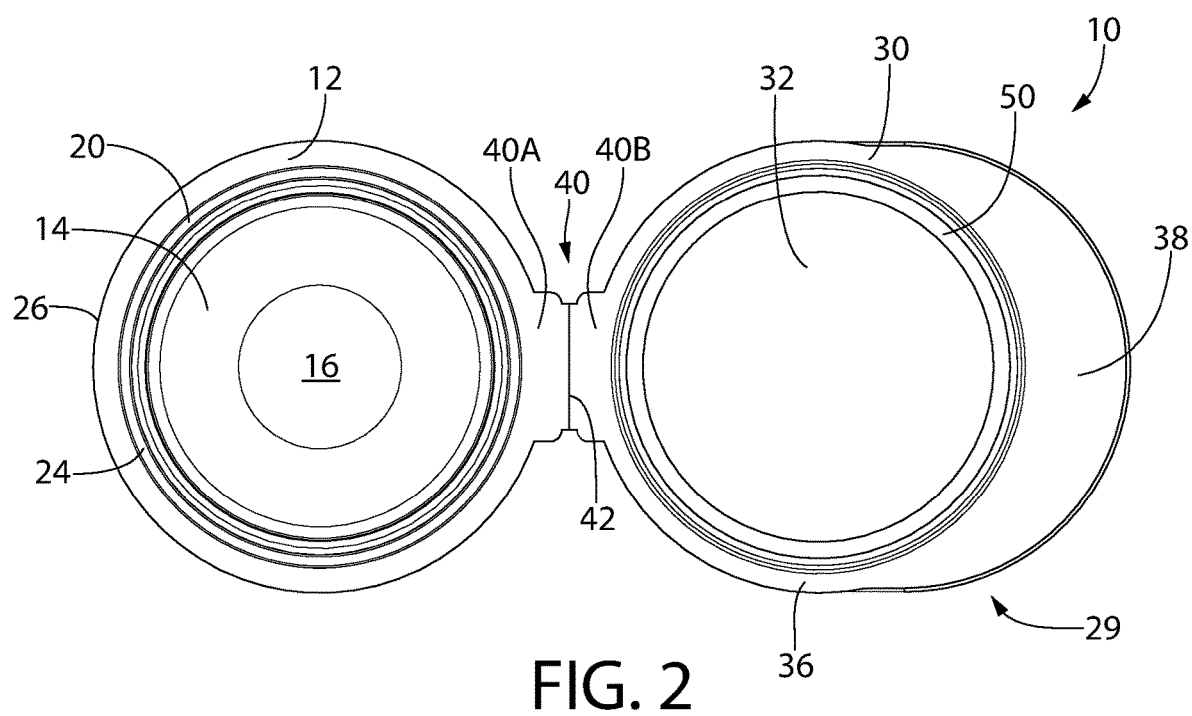
FIG. 2 is a top view of the container assembly of FIG. 1 shown with the cap disposed in an open position.

Referring now to FIGS. 1 and 2, a moisture tight, resealable, container assembly 10 in accordance with an illustrative embodiment of the present invention is illustrated. Container assembly 10 includes a container 12 having a base 14, an internal cavity 16, an outer surface 18, an upper portion 20 and a lower portion 22. Container 12 further includes a rim 24 which projects radially outwardly at the upper portion 20. Container 12 may also include a flange 26, spaced a predetermined distance from rim 24, which projects radially outwardly from the outer surface 18 of the container 12.

Continuing to refer to FIGS. 1 and 2, container assembly 10 further includes a cap assembly 29 including a cap 30 having a base 32 and a skirt 34 extending perpendicularly from base 32 around the outer periphery of base 32. A recess 36 is optionally formed in an inner wall 37 of skirt 34 at or near base 32. Cap 30 optionally further includes a thumb tab 38 for facilitating the opening and closing of container assembly 10. Cap 30 is coupled to container 12 by a hinge 40. Tab 38 and hinge 40 are preferably positioned on opposing ends of cap 30 and extend perpendicularly from skirt 34. Hinge 40 may also be attached to flange 26 of container 12. Hinge 40 optionally includes a recess 42 that functions as a bending point during the opening and closing of the container assembly 10. Hinge 40 optionally includes two elements, 40A and 40B, respectively, formed on either side of recess 42. First element 40A may be attached to flange 26 of container 12 (or another part of container 12) and second element 40B is attached to the cap 30. As will be discussed further below, in an exemplary embodiment of the disclosed concept, the elements of container 12 and cap assembly 29 discussed thus far are produced via an injection molding process. In the exemplary embodiment of FIGS. 1 and 2, container 12 and cap 30 are formed (via injection molding) from a plastic material as portions of a single unitary component. However, it is to be appreciated that such components may alternatively be formed separately without varying from the scope of the present invention.

Container 12, cap 30 and hinge 40 may be made primarily from one or more injection moldable thermoplastic materials, including, for example, a polyolefin such as polypropylene or polyethylene. According to an optional embodiment, the container assembly 10 may be made from a mixture comprising primarily thermoplastic material and a very small proportion of thermoplastic elastomer material (wherein the final hardened product is essentially hard or incompressible). Optionally, a polymer construction of the container assembly 10 (other than seal 50, discussed below) may have up to 2% TPE by weight.

In order to provide for an improved moisture tight seal between cap 30 and container 12, cap assembly 29 further includes a compressible seal 50 which is of similar shape as upper portion 20 of container 12 and cap 30 and which is formed from a softer material and/or a material having a lower melting point (e.g., a thermoplastic elastomer) than the material from which container 12 and cap 30 is formed. As used herein, the terms "elastomer" or "elastomeric material" are to be understood in a broad sense. A particularly preferred elastomer for seal 50 is a thermoplastic elastomer (TPE), optionally one having a Shore A hardness of from 20 to 50, preferably from 20 to 40, more preferably from 20 to 35. Alternatively, the terms "elastomer" or "elastomeric material" may include silicone rubbers or other preferably injection moldable soft and resilient materials appropriate for creating a compression seal against a comparatively harder (e.g., thermoplastic) surface. Formation of seal 50 is discussed in detail below.

Figure 3:
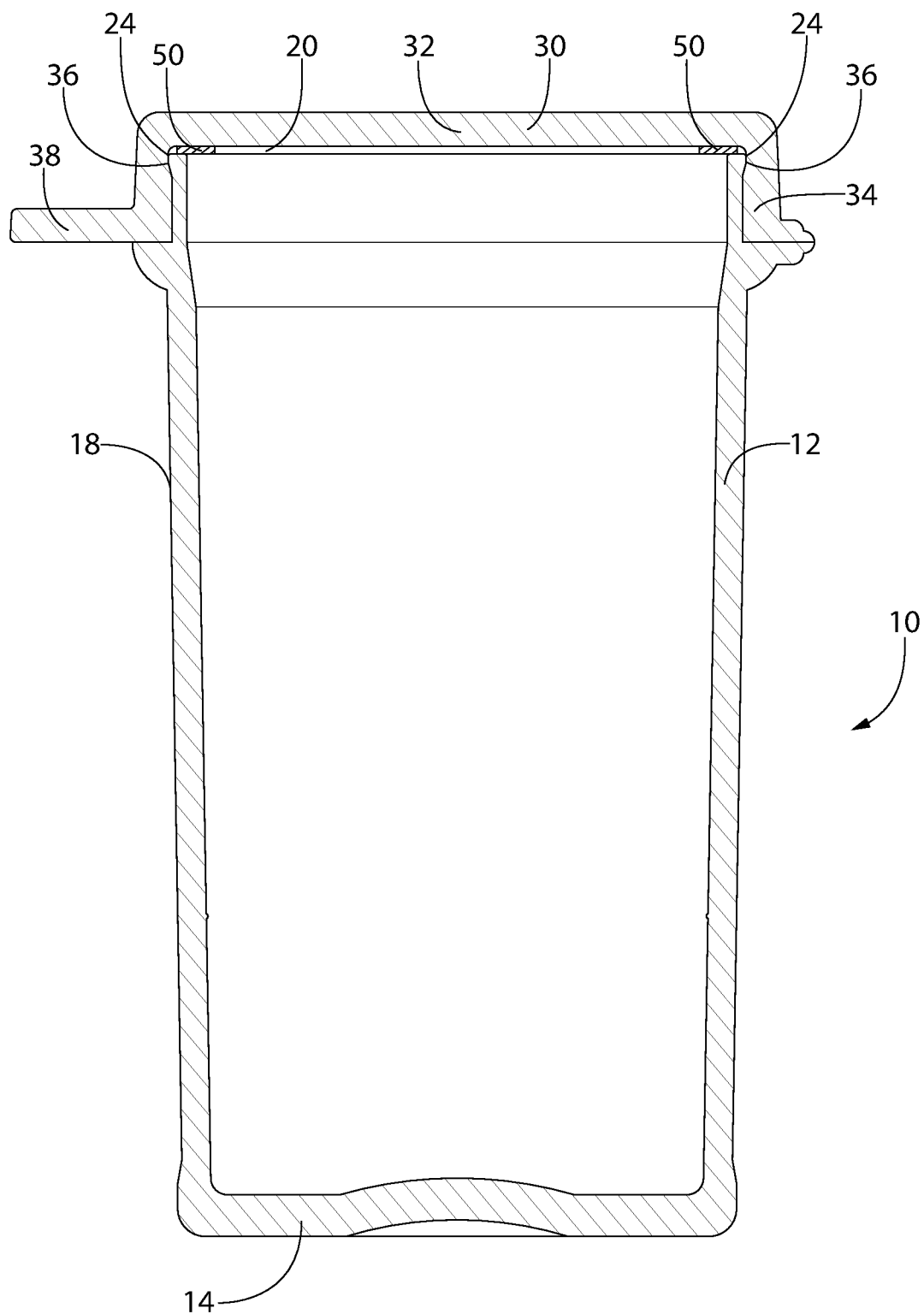
FIG. 3 is a sectional side elevation view of the container assembly of FIGS. 1 and 2 shown with the cap disposed in a closed position.

FIG. 3 illustrates a cross-sectional view of container assembly 10 in a closed position. In such closed position, skirt 34 of cap 30 overlies container 12 and rests upon flange 26 thereof. Rim 24 of container 12 is situated within, and sealingly engages recess 36 of inner wall 37 of skirt 34 of cap 30, thus creating a hard sealing arrangement (e.g., a thermoplastic-to-thermoplastic sealing engagement). Providing an additional sealing engagement is seal 50, which is compressed between base 32 of cap 30 and upper portion 20 of container 12, thus creating a soft-sealing arrangement. It is to be appreciated that container 12 can be sealed and/or resealed by applying, in a singular motion, downward pressure upon thumb tab 38 or base 32 of cap 30 to obtain a moisture tight seal. It is to be appreciated that in such closed position, the two different sealing arrangements, i.e., the aforementioned hard-sealing arrangement and soft-sealing arrangement, provide for an improved sealing arrangement over existing solutions. The hard sealing arrangement also provides a snap-fit closure arrangement, which provides closure force necessary to effectuate the soft sealing engagement and maintain the container assembly 10 in a closed position.

In order to provide such improved moisture tight sealing, the interacting surfaces of the hard sealing arrangement, i.e., the surfaces of rim 24 of container 12 and recess 36 of lid 30, must be free from scratches and parting lines or else moisture can easily transfer past such hard seal. As a result of such requirement, seal 50 cannot be over-molded onto base 32 of cap 30, as removal of the core needed to form cap 30 and reinsertion of the other core needed to form seal 50 may result in scratching/scarring of the surface of recess 36, thus creating a point for moisture ingress. In order to avoid such scratching/scarring of the surface of recess 36 of cap 30, cap 30 is instead uniquely over-molded onto seal 50, an example of which is described below in conjunction with FIGS. 4 and 5.

Figure 4:
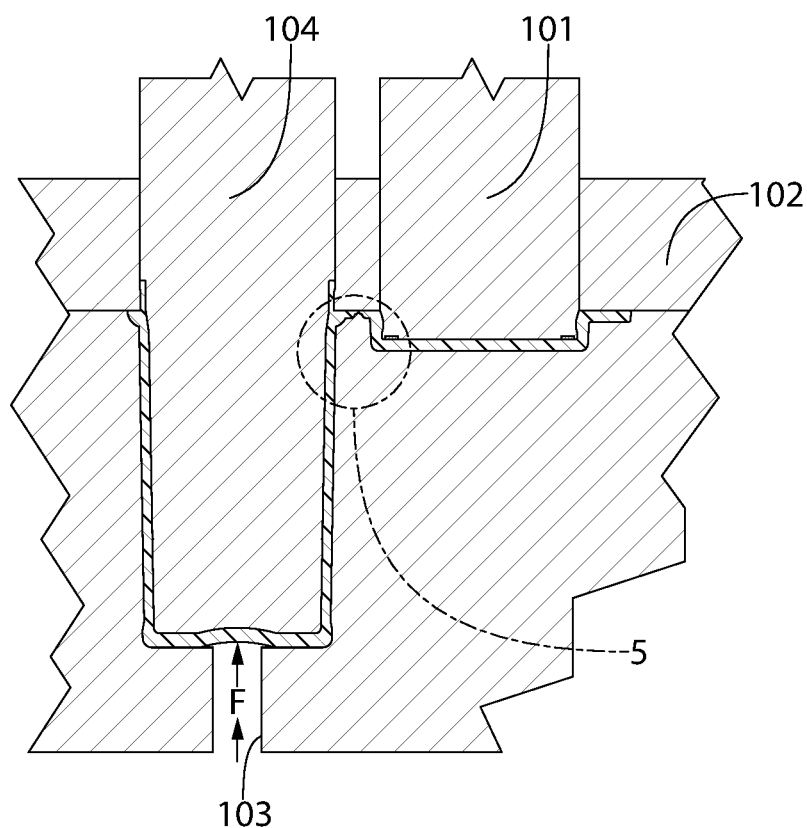
FIG. 4 is a partially schematic sectional view showing molds and cores used while a container assembly such as illustrated in FIG. 1 is formed during an injection molding process.
Figure 5:
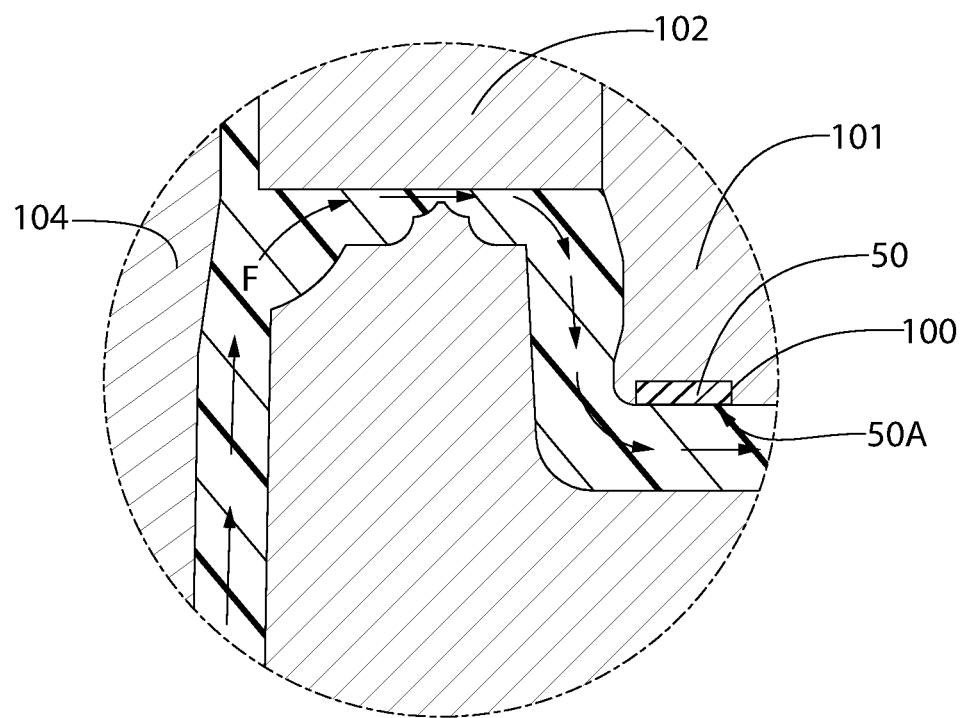
FIG. 5 is a detailed view of the portion of FIG. 4 indicated at 5.

Referring now to FIGS. 4 and 5, an example of the injection molding process by which container assembly 10 is formed will be discussed. In an initial step, seal 50 is provided in a groove 100 of a first core member 101 which is placed in a mold assembly 102 (shown cross-hatched in FIGS. 4 and 5). Seal 50 may be formed via injection molding or other suitable process and as previously discussed, is formed from a soft TPE material, optionally one having a Shore A hardness of from 20 to 50, preferably from 20 to 40, more preferably from 20 to 35 (once solidified). Seal 50 is provided in groove 100, such that only a single surface, i.e., surface 50A, thereof is exposed. Next, a supply of molten plastic, as shown generally by flow arrows F, is injected into mold assembly 102 via a port 103, optionally located near the portion of mold assembly 102 which corresponds to base 14 of container 12. After filling the portion of mold assembly 102 which corresponds to container 12 (i.e., the space around core 104), the supply F of molten plastic passes through the portion of mold assembly 102 which corresponds to hinge 40 and into the portion which corresponds to cap 30 and includes seal 50, such as schematically illustrated in FIG. 5. In filling out the remainder of mold assembly 102, the supply F of molten plastic flows generally parallel to the exposed surface 50A of seal 50, and thus generally does not disturb the previously formed seal while over-molding/bonding thereto. After mold assembly 102 has been filled, the molten plastic is allowed to cool/solidify, thus forming cap assembly 29 (i.e., the cap 30 with the seal 50) and container 12, which makes up the completed container assembly 10. The container assembly 10 is then removed from mold 102. Optionally, in an alternative embodiment, cap assembly is formed in a separate mold from container and subsequently assembled therewith.

It is to be appreciated that conventional practice in injection molding is to mold a softer material onto a harder material as otherwise the harder material will tend to force the softer material out of the mold. However, according to the unique disclosed concept, by effectively shielding the softer material of seal 50 in groove 100 such that only surface 50A thereof is exposed, and then causing the supply F of harder plastic to pass generally parallel and adjacent to such surface, the harder plastic material which forms the remainder of container assembly 10 can be over-molded to seal 50, thus producing the unblemished surface of recess 36 previously discussed.

As illustrated in FIG. 2, the cap 30, container 12 and seal 50 may be generally circular in shape. Alternatively, the cap 30, container 12 and seal 50 may be of non-circular shape, without regard to whether the shape is symmetrical or asymmetrical, without varying from the scope of the present invention. Other suitable shapes include square, triangle, ellipse, rectangle, trapezoid, and numerous others. For example, elliptical containers such as those disclosed in U.S. Pat. Pub. No. 20110127269, which is incorporated by reference herein in its entirety, may advantageously be molded according to concepts disclosed herein. If the assembly is provided with corners, they may be squared or rounded. It is contemplated that molding techniques according to the disclosed concept would be particularly useful in enhancing the sealing of non-round containers, which tend to be more difficult to render moisture tight using only more conventional hard seals (without a hard to soft compression seal).

In an exemplary embodiment of the disclosed concept, the seal 50 has a vertical thickness of from 0.25 mm to 1.25 mm.

The container assembly 10 may be generally of any desired size needed in order to house desired contents. Although shown as being integrally formed as a unitary element, it is to be appreciated that cap 30 and container 12 could also be formed as separate elements and then assembled together, as long as cap 30 and seal 50 are otherwise formed generally as described herein.

Figure 6:
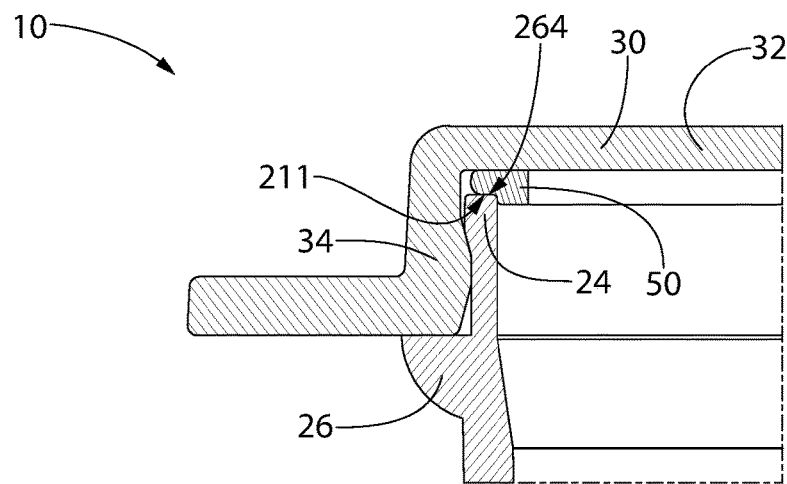
FIG. 6 is an enlarged cross sectional view of the container of FIG. 3 illustrating engagement of first and second seals in series to create a moisture tight seal.

An optional feature of the disclosed concept is now discussed. Referring to FIG. 6, there is shown an enlarged view of a portion of the container assembly 10 shown in FIG. 3. Upper portion 20 of container 12 terminates at a top edge 211. The top edge 211 compresses seal 50 to provide a sealing engagement 264 when the container 10 assembly is closed, as discussed above. The compressible sealing surface 230 of the seal 50 is configured to be compressed by a comparatively hard upper surface 211 of the upper portion 20 of the container 12, when the container assembly 10 is closed. Seal 50 in the exemplary embodiment is optionally in the form of a ring. The term "ring" as used herein can refer to an annular round element with a central opening. However, a "ring" is not necessarily limited to such configuration and could include non-round configurations as well as elastomeric elements that are filled in, at least in part, in the center (i.e., where an opening of a ring may otherwise be). As such, a "ring" could include a disc-shaped elastomeric member, for example.

Figure 7A:
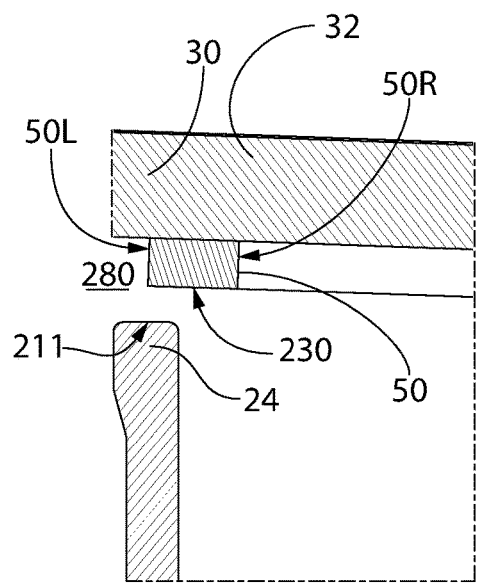
FIGS. 7A and 7B are schematic illustrations showing the soft seal of the cap immediately before engagement with the hard sealing surface of the body (FIG. 7A) followed by sealing engagement of the soft seal of the cap with the hard sealing surface of the body (FIG. 7B).
Figure 7B:
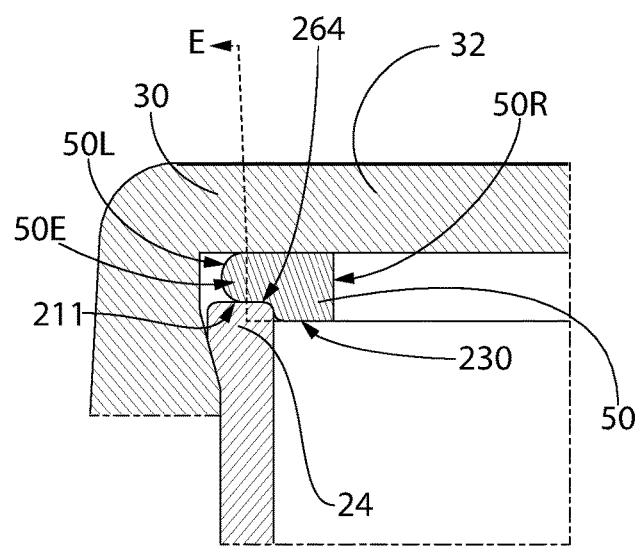

FIGS. 7A and 7B are schematic illustrations showing the seal 50 immediately before engagement with the thermoplastic sealing surface of the body (FIG. 7A) followed by sealing engagement 264 of the seal 50 with the upper surface 211 of the container 12 (FIG. 7B, which is actually an enlarged view of FIG. 6). Vertical compression of the seal 50 causes a portion of the seal 50 to elastically and resiliently deform and expand radially into a void 280 provided between the container 12 and the lid 30. This operation is now explained in detail.

FIG. 6 shows a partial enlarged cross section of the container assembly 10 with the lid 30 in the closed position. A sealing engagement 264 in the form of a compression seal provided between the upper surface 211 of the container 12 and the seal 50 causes the cross section of the seal 50 to appear slightly stepped or indented along the engagement surface 230 of the seal 50. For illustrative purposes, this indent is more clear and pronounced in the enlarged view shown in FIG. 7B. FIG. 7A shows the cross section of the seal 50 immediately before it contacts the upper surface 211 of the container 12 to form the sealing engagement 264. As shown in 7A, the seal 50, when not engaged with the upper surface 211, does not have such an indent. The indent in the engagement surface 230 of the seal 50 is the product of elastomeric deformation of the seal 50 resulting from sealing engagement 264 with the rim upper surface 211.

Notably, the seal 50 (e.g., in the form of a ring) is not bounded or blocked by any structure on either an immediate right side 50R or left side 50L thereof. As such, when the seal 50 is compressed vertically, a portion thereof elastically expands or migrates radially outward (towards the left), inward (towards the right) or both. A void 280 is provided, e.g., between the seal 50 and the skirt 34 of the lid 30 to provide "living space" for the seal material to radially expand when engaged. FIG. 7B illustrates the radially expanded portion 50E of the seal (shown expanded in direction E of FIG. 7B), occupying a portion of the void 280. To the extent such expansion appears in the Figures to be exaggerated compared to actual implementation, it is merely for illustrative purposes. This radial expansion into the void feature provides at least two important functions.

First, it results in tempering the vertical spring force between the elastomer and the rim. While it is desired that some slight spring force is provided to strengthen or reinforce the sealing engagement 264, excessive spring force may tend to reduce the opening force to an extent that the container may inadvertently pop open. A balance must be struck between a desirably low opening force on the one hand (especially for elderly and/or diabetic users) and an opening force that is so low that it can result in inadvertent container openings, e.g., via common pressure variations that may occur within the container during transport. When the soft material (e.g., elastomer) of seal 50 is permitted to expand radially, the vertical spring force may thus be provided at an acceptable level.

The second important function is that the surface area of contact between the respective sealing surfaces of the sealing engagement 264 increases via radial expansion of the relatively soft material of the seal 50. This increase of the soft-to-hard (e.g., elastomer-to-thermoplastic) sealing surface area provides a more robust seal at the site of seal engagement 264.

In the molding art, methods according to optional aspects of the disclosed concept enable one to provide the seal 50 without it being bounded, blocked or reinforced on either an immediate right side 50R or left side 50L thereof, e.g., by a thermoplastic extension on the lid 30 or other structure.

Optionally, a container assembly according to any embodiment of the disclosed concept may be advantageously used to house diagnostic test strips, drug delivery strips, biologic compositions, supplements, pharmaceuticals or any other product sensitive to moisture. Optionally, a container assembly according to any embodiment may include therein a desiccant material (e.g., in the form of a desiccant entrained polymer, preferably a three-phase desiccant entrained polymer) to absorb moisture in the internal cavity. The term "three phase polymer" refers to a desiccant entrained polymer comprising a base polymer, desiccant and channeling agent, e.g., as described in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is incorporated herein by reference as if fully set forth. Advantageously, in an optional aspect of the invention, the soft-to-hard seal in combination with the hard-to-hard seal (in series) reliably reduces moisture ingress. This, in turn, permits reduced use of such desiccant material, resulting in lower manufacturing costs. Optionally, a desiccant entrained polymer insert may be assembled to or co-molded with the container.

EXAMPLES

The invention will be illustrated in more detail with reference to the following Examples, but it should be understood that the present invention is not deemed to be limited thereto.

Example 1

Tests were run to measure moisture ingress of 24 ml vials according to the container embodiment shown in FIGS. 1-3 and made according to injection molding processes discussed herein (Group A). Ambient conditions were set at 30° C. and 80% relative humidity. There were 48 such containers in the tested population. These moisture ingress results were compared against testing data gathered from testing a population of 7553 containers (Group B) that were identical in material respects to the containers of Group A, except the containers of Group B only included a hard seal (plastic-to-plastic)—without the additional (soft) seal (elastomer-to-plastic). The following table shows a side-by-side comparison of the data collected.

| Group | Mean Ingress (μg/day) | Standard Deviation (μg/day) | Sample Size |
|---|---|---|---|
| A | 399.8 | 22.61 | 48 |
| B | 440.9 | 105.5 | 7553 |

As the data show, the addition of the second seal resulted in a meaningful reduction of the mean ingress and a surprisingly significant reduction in the standard deviation of moisture ingress. This significant reduction in standard deviation is notable and important from a production standpoint. Essentially, the soft seal in combination with the hard seal allows for a much more controlled and predictable (i.e., lower variation) in moisture ingress so that container moisture budgets can be much more precisely met. This allows for a reduction in desiccant material necessary per vial and hence a reduction in production costs associated with the reduced amount of desiccant material.

Example 2

Tests were run to measure moisture ingress of 17 ml vials according to the container embodiment shown in FIGS. 1-3 and made according to injection molding processes disclosed herein (Group A'). Ambient conditions were set at 30° C. and 70% relative humidity. There were 144 such containers in the tested population. These moisture ingress results were compared against testing data gathered from testing a population of 2923 containers (Group B') that were identical in material respects to the containers of Group A', except the containers of Sample B' only included a hard seal (plastic-to-plastic)—without the additional (soft) seal (elastomer-to-plastic). The following table shows a side-by-side comparison of the data collected.

| Group | Mean Ingress (μg/day) | Standard Deviation (μg/day) | Sample Size |
|---|---|---|---|
| A' | 305.4 | 20.54 | 144 |
| B' | 420.7 | 76.91 | 2923 |

As with Example 1, the data show that addition of the soft seal to assemblies having the hard seal resulted in a meaningful reduction of the mean ingress and a surprisingly significant reduction in the standard deviation of moisture ingress.

It should be noted that nominal volumetric measurements with reference to diagnostic test strip vials are approximate and generally understood in the industry. For example, a "17 mL" vial may vary slightly from that precise volumetric measurement as may a "24 mL" vial. These vial volumes are well understood in the industry. To address this issue, for some embodiments, a volumetric range is provided, e.g., a container having an internal volume of 12 mL to 30 mL.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A method of over-molding materials, the method comprising:
   providing a first material in a groove in a first portion of a mold such that only a single surface of the first material is exposed to a vacant portion of the mold;
   providing, via an injection molding process, a second material in a liquid form in the vacant portion of the mold adjacent to the single surface of the first material, wherein the second material flows parallel to the single surface of the first material as the second material engages the single surface of the first material; and
   allowing the second material to solidify and become directly coupled to the first material thus forming a single component,
   wherein the second material has one or both of: a greater hardness when solidified than the first material or a higher melting temperature than the first material.

2. The method of claim 1, wherein providing a first material in a groove comprises providing the first material in the groove via another injection molding process.

3. The method of claim 1, further comprising removing the component from the mold.

4. The method of claim 1, wherein the first material is an elastomeric material that is injected in liquid form into the groove in the first portion of the mold.

5. The method of claim 4, wherein the second material is a polyolefin, which has a greater hardness when solidified than the first material.

6. A method of forming a cap assembly for use with a container in forming a container assembly, the cap assembly including a seal formed from a first material and a cap formed from a second material having one or both of a greater hardness when solidified than the first material or a higher melting temperature than the first material, the method comprising:
   providing, in a mold having a portion which defines the shape of the cap assembly, the first material in a groove in a first portion of the mold such that only a single surface of the first material is exposed to a vacant portion of the mold;
   providing, via an injection molding process, a second material in a liquid form in the vacant portion of the mold adjacent to the single surface of the first material, wherein the second material flows parallel to the single surface of the first material as the second material engages the single surface of the first material; and
   allowing the second material to solidify and become directly coupled to the first material, thus forming the cap assembly.

7. The method of claim 6, wherein providing a first material in a groove comprises providing the first material in the groove via another injection molding process.

8. The method of claim 6, wherein the first material is an elastomeric material that is injected in liquid form into the groove in the first portion of the mold.

9. The method of claim 8, wherein the second material is a polyolefin, which has a greater hardness when solidified than the first material.

10. The method of claim 6, further comprising removing the cap assembly from the mold.

11. The method of claim 6, wherein the mold further has a portion which defines the shape of the container;
   wherein the method further comprises: before providing the second material in the portion of the mold which defines the shape of the cap, providing, via the injection molding process, the second material in the liquid form in the portion of the mold which defines the shape of the container; and
   wherein allowing the second material to solidify and become directly coupled to the first material thus forming the cap assembly further comprises allowing the second material to solidify, thus forming a container assembly in which the container is formed integrally with the cap.

12. The method of claim 11, further comprising removing the container assembly from the mold.

13. A moisture tight, resealable container assembly comprising: a container coupled to a cap assembly, the cap assembly being formed in accordance with the method of claim 6.

14. The moisture tight, resealable container assembly of claim 13, wherein the container comprises an upper portion having an opening leading to an internal cavity, the upper portion comprising a rim projecting radially outwardly.

15. The moisture tight, resealable container assembly of claim 14, wherein the cap assembly has a base and a skirt extending perpendicularly from the base around the outer periphery of the base, the cap assembly being coupled to the container by a hinge.

16. The moisture tight, resealable container assembly of claim 15, further comprising a recess formed in an inner wall of the skirt, wherein when the container assembly is in a closed position, the skirt overlies the container and the rim is situated within the recess of the inner wall of the skirt to provide a snap-fit closure arrangement between the cap assembly and the container.

17. The moisture tight, resealable container assembly of claim 16, wherein when the container assembly is in the closed position, a soft sealing arrangement is created between the upper portion of the container and the seal of the cap assembly.

18. The moisture tight, resealable container assembly of claim 17, wherein the seal is in the form of a ring, and wherein when the container assembly is in the closed position, the soft sealing arrangement is formed by vertical compression of the ring, which causes a portion of the ring to elastically expand radially into a void provided between the container and the cap.

19. The method of claim 6, wherein, the second material is injected into the mold via a port located near a portion of the mold that corresponds to a base of the container; and
   wherein the container and the cap assembly are integrally formed.

* * * * *